United States Patent
Imamura et al.

[11] Patent Number: 5,928,098
[45] Date of Patent: Jul. 27, 1999

[54] CONTINUOUSLY VARIABLE TRANSMISSION FOR VEHICLES

[75] Inventors: Masahiro Imamura; Yorinori Kumagai, both of Saitama, Japan

[73] Assignee: Honda Giken Kogyo Kabushiki Kaisha, Tokyo, Japan

[21] Appl. No.: 09/095,287

[22] Filed: Jun. 10, 1998

[30] Foreign Application Priority Data

Jun. 10, 1997 [JP] Japan .................................. 9-151927

[51] Int. Cl.⁶ .................................................. F16H 47/04
[52] U.S. Cl. .................................................. 475/81
[58] Field of Search ........................................ 475/80, 81

[56] References Cited

FOREIGN PATENT DOCUMENTS

8-74965  3/1996  Japan .

*Primary Examiner*—Dirk Wright
*Attorney, Agent, or Firm*—Lyon & Lyon LLP

[57] ABSTRACT

A continuously variable transmission for vehicles, in which the power from a prime mover is divided by a power dividing mechanism and transmitted to a hydraulic continuously variable transmission (HCVT) apparatus and to a mechanical transmitting means for mechanical transmission of power, and the power from the HCVT apparatus and the mechanical transmitting means is collected and selectively outputted for satisfying both the maximum speed performance and the fuel consumption performance of the vehicle. A lock-up brake in the power dividing mechanism stops the rotation of the hydraulic pump of the HCVT so that the power from the input member may be mechanically transmitted to the mechanical transmitting means only via the power dividing mechanism to achieve a minimum gear ratio. A lock-up clutch directly connects the input member and the mechanical transmitting means so that the power from the input member may be directly and mechanically transmitted to the mechanical transmitting means to achieve a greater gear ratio than the minimum reduction ratio.

5 Claims, 7 Drawing Sheets

CONTINUOUSLY VARIABLE TRANSMISSION FOR VEHICLES

BACKGROUND OF THE INVENTION

The present invention relates to a continuously variable transmission for a vehicle, in which the power from a prime mover is divided by a power dividing mechanism and transmitted to a hydraulic continuously variable transmission apparatus and to a transmitting means for mechanical transmission of power, and the power from the hydraulic continuously variable transmission apparatus and the transmitting means is collected and outputted.

Conventionally, such a transmission is already known by, for example, Japanese Patent Application Laid-open No. 8-74965.

Although such a continuously variable transmission is capable of continuously varying the speed of the power from a prime mover and transmitting it to the driving wheel side by hydraulic power transmission with excellent continuous speed variability and by mechanical power transmission with excellent transmission efficiency, it is desirable, where a better fuel consumption performance is required in constant high speed traveling during cruising or the like, to make the power transmission by the hydraulic continuously variable transmission apparatus ineffective which is less than excellent in transmission efficiency, and to transmit the power only by mechanical power transmission. Therefore, it is conceivable, when a minimum gear ratio is to be achieved, to forcedly stop the operation of the hydraulic pump in the hydraulic continuously variable transmission apparatus to make ineffective the power transmission by the hydraulic continuously variable transmission apparatus, eliminate the drive loss in the hydraulic continuously variable transmission apparatus, and improve the fuel consumption performance by mechanical power transmission by a power dividing mechanism and transmitting means.

However, if the gear ratio intended for achieving the maximum speed (a greater gear ratio than the minimum gear ratio) is to be achieved only by mechanical power transmission by the aforementioned power dividing mechanism and transmitting means, the driving force may be insufficient and the maximum speed may be impossible to achieve, depending on the vehicle performance such as the prime mover output, vehicle weight and traveling resistance; or if the maximum speed is to be achieved with the hydraulic continuously variable transmission apparatus, though it becomes possible to secure a suitable gear ratio for achieving the maximum speed, the driving force may also be insufficient and the maximum speed may be impossible to achieve because the hydraulic continuously variable transmission apparatus is less than excellent in transmission efficiency.

SUMMARY OF THE INVENTION

The object of the present invention, in view of these circumstances, is to provide a continuously variable transmission capable of satisfying both the maximum speed performance and the minimum fuel consumption performance of the vehicle.

In order to achieve the aforementioned object, the present invention is characterized in that, in a continuously variable transmission for vehicles, including a power dividing mechanism provided with an input member to which the power from a prime mover is inputted that is capable of dividing the power inputted to the input member and outputting it from first and second output members; a hydraulic continuously variable transmission apparatus provided with a hydraulic pump connected to the first output member and a hydraulic motor constituting a closed hydraulic circuit together with the hydraulic pump, at least either of the hydraulic pump and the hydraulic motor being configured in a variable displacement type; and transmitting means capable of mechanically transmitting power and connected to the second output member; the power dividing mechanism collects the power from the hydraulic motor and transmitting means and outputs it; the power dividing mechanism is so configured as to be able to vary the output speed of the power inputted to the input member and divide it between the first and second output members, stopping means capable of stopping the rotation of the hydraulic pump is provided between the hydraulic pump and a fixed member so that the power from the input member may be mechanically transmitted to the transmitting means only via the power dividing mechanism to achieve a minimum gear ratio; and directly connecting means capable of connecting said input member and transmitting means is provided between the input member and transmitting means so that the power from the input member may be directly and mechanically transmitted to the transmitting means to achieve a greater gear ratio than the minimum gear ratio.

With such a configuration, it is possible to rotate the prime mover at a low speed and obtain a minimum gear ratio by achieving the minimum gear ratio by mechanical power transmission by the power dividing mechanism and transmitting means as a consequence of the stopping of the hydraulic pump, thereby to secure quiet thanks to the stop of the hydraulic continuously variable transmission apparatus and to improve the fuel consumption performance by enhancing the transmission efficiency. Furthermore, it is possible to achieve the maximum speed performance by obtaining sufficient driving force in the region where such a driving force is needed by achieving a greater gear ratio than the minimum gear ratio through mechanical power transmission by direct connection of the input member to the transmitting means.

According to a more specific aspect of the present invention, the power dividing mechanism is provided with first and second planetary gear mechanisms, wherein the first planetary gear mechanism has as its constituent elements a first sun gear, a first ring gear and a first carrier, with a first constituent element connected to the prime mover side as the input member; the second planetary gear mechanism has as its constituent elements a second sun gear, a second ring gear and a second carrier, with a first constituent element connected to a stationary member; a second constituent element in the first planetary gear mechanism and a second constituent element in the second planetary gear mechanism are connected to each other; one of a third constituent element in the first planetary gear mechanism and a third constituent element in the second planetary gear mechanism is connected to the hydraulic pump as the first output member; and the other of the third constituent element in the first planetary gear mechanism and the third constituent element in the second planetary gear mechanism is connected to the transmitting means as the second output member.

With such a configuration of the invention, when the hydraulic pump is stopped by the stopping means, out of the constituent elements constituting the first planetary gear mechanism, i.e. the first sun gear, the first ring gear and the first carrier, the constituent element connected to the hydraulic pump and functioning as a first output member is stopped, and the power from the prime mover is varied in speed and transmitted to the transmitting means by the first planetary gear mechanism one of whose constituent elements is stopped, and the second planetary gear mechanism, in a state where power transmission by the hydraulic continuously variable transmission apparatus is made ineffective, making it possible to obtain the minimum gear ratio. Furthermore, when, among the constituent elements constituting the first planetary gear mechanism, i.e. the first sun gear, the first ring gear and the first carrier, the constituent element functioning as an input member is connected to the transmitting means by the directly connecting means, the power is directly transmitted mechanically from the input member to the transmitting means not through the first and second planetary gear mechanisms and the hydraulic continuously variable transmission apparatus, making it possible to achieve a greater gear ratio than the minimum gear ratio.

Other objects and advantages of the invention will appear from the modes for carrying out the present invention that will be described below on the basis of embodiments of the invention illustrated in the accompanying drawings.

DETAILED DESCRIPTION OF THE PREFERRED EMBODIMENTS

FIG. 1 to FIG. 5 illustrate a first embodiment of the invention. First, referring to FIG. 1, the power outputted from an engine E as a prime mover is inputted to a continuously variable transmission $T_1$ via a flywheel F, and the power whose speed has been varied by the continuously variable transmission $T_1$ is outputted from a power collecting shaft 1.

Figure 1:
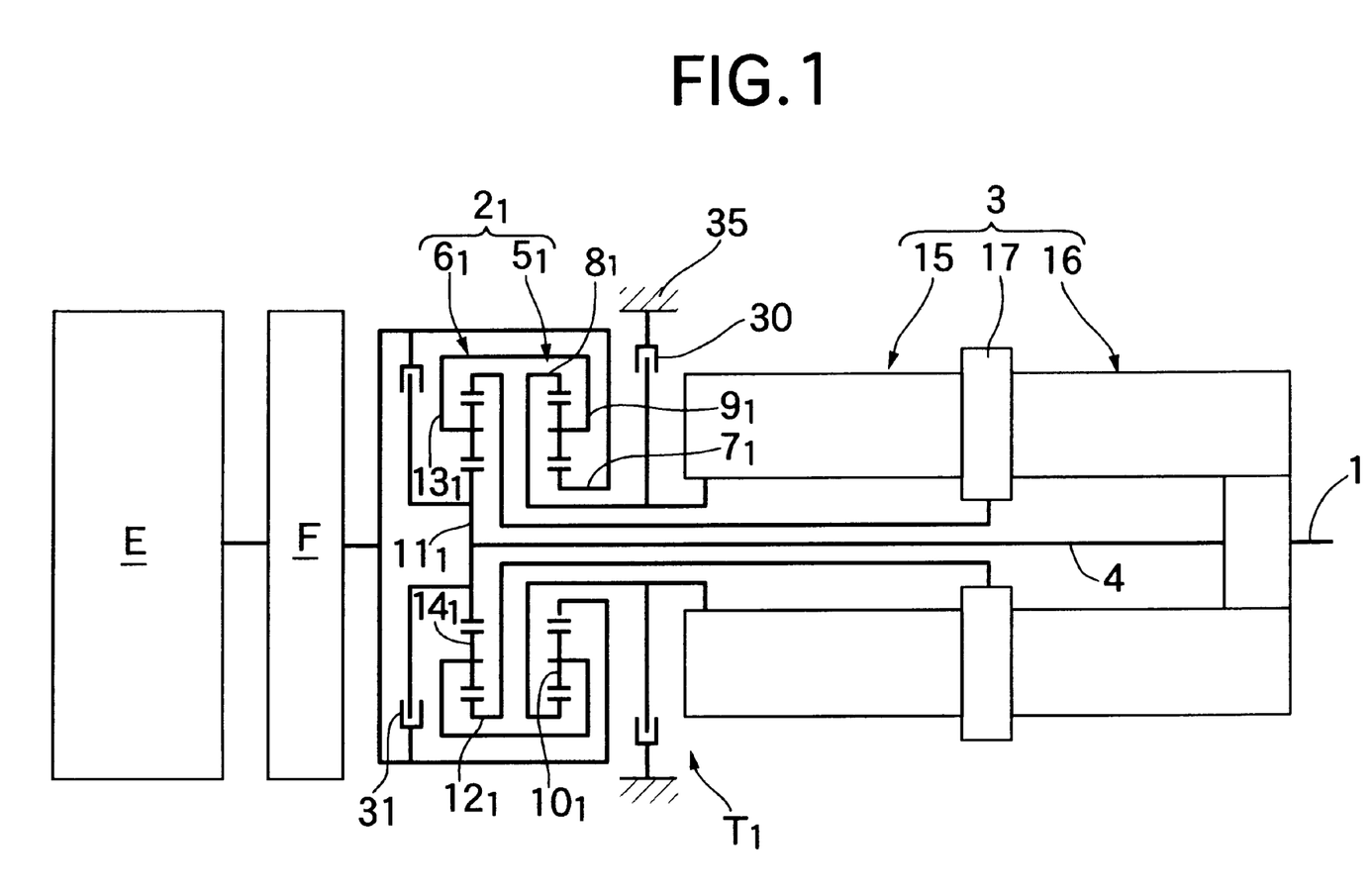
FIG. 1 is a diagram schematically illustrating the configuration of a continuously variable transmission for vehicles, which is a first embodiment of the invention.

The continuously variable transmission $T_1$ is provided with a power dividing mechanism $2_1$, a hydraulic continuously variable transmission apparatus 3 and a transmission shaft 4 as transmitting means for mechanically transmitting power. The power inputted via the flywheel F from the engine E to a power dividing mechanism $2_1$ is divided by the power dividing mechanism $2_1$ and transmitted to the hydraulic continuously variable transmission apparatus 3 and the transmission shaft 4, and the power from the hydraulic continuously variable transmission apparatus 3 and the transmission shaft 4 is collected by a power collecting shaft 1.

The power dividing mechanism $2_1$ is provided with a first planetary gear mechanism $5_1$ and a second planetary gear mechanism $6_1$. The first planetary gear mechanism $5_1$ is configured of a first sun gear $7_1$ rotatable around the same axis as the transmission shaft 4, a first ring gear $8_1$ coaxially surrounding the first sun gear $7_1$, and a first carrier $9_1$ supporting, for free rotation, a plurality of first planetary gears $10_1$ engaging with the first sun gear $7_1$ and the first ring gear $8_1$ as its constituent elements. The first sun gear $7_1$ is connected to the flywheel F to function as an input member, and the first ring gear $8_1$ functions as a first output member to transmit power to the hydraulic continuously variable transmission apparatus 3.

The second planetary gear mechanism $6_1$ comprises a second sun gear $11_1$ rotatable around the same axis as the transmission shaft 4, a second ring gear $12_1$ coaxially surrounding the second sun gear $11_1$, and a second carrier $13_1$ supporting, for free rotation, a plurality of second planetary gears $14_1$ engaging with the second sun gear $11_1$ and the second ring gear $12_1$ as its constituent elements. The second carrier $13_1$ is integrally connected to the first carrier $9_1$ of the first planetary gear mechanism $5_1$, the second sun gear $11_1$ is integrally connected to the transmission shaft 4 so as to function as a second output member, and the second ring gear $12_1$ is connected to a control board 17 of the hydraulic continuously variable transmission apparatus 3 functioning as a stationary member.

Figure 2:
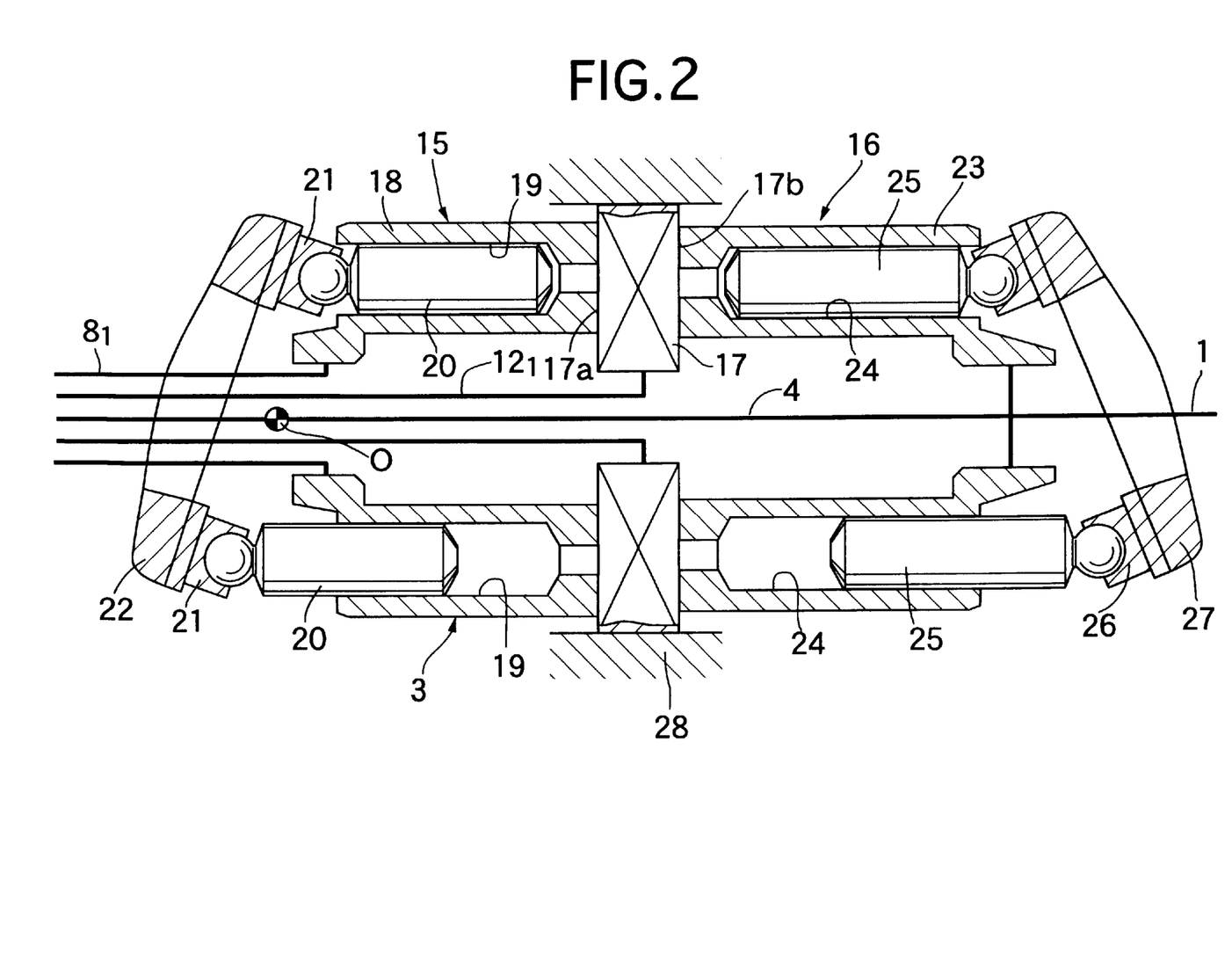
FIG. 2 is a cross section schematically illustrating the configuration of a hydraulic continuously variable transmission apparatus of FIG. 1.

In FIG. 2, the hydraulic continuously variable transmission apparatus 3 is a known conventional one provided with a hydraulic pump 15, a hydraulic motor 16, and the control board 17 for forming a closed hydraulic circuit connecting the hydraulic pump 15 and the hydraulic motor 16, and the hydraulic pump 15 and the hydraulic motor 16 are arranged on the same axis as the transmission shaft 4.

The hydraulic pump 15 is provided with a pump cylinder 18 coaxially connected to the first ring gear 81 provided as first output member in the first planetary gear mechanism $5_1$, the pump cylinder 18 being in contact, in a rotatable and slidable manner, with one hydraulic pressure distributing face 17a of the control board 17; a plurality of pump plungers 20 fitted slidably in a like plurality of annularly arranged cylinder holes 19 so provided in the pump cylinder 18 as to surround the axis of the pump cylinder 18; and a pump swash plate 22 in a slidable contact with shoes 21 installed swingably on the spherical tips of the pump plungers 20. The pump swash plate 22 is rotatable around a trunnion axis O which is orthogonal to the axis of the pump cylinder 18, i.e. the axis of the transmission shaft 4 and, by varying the inclination angle of the pump swash plate 22, the reciprocating stroke of each of the pump plungers 20 can be varied. Thus, the hydraulic pump 15 is of a variable displacement type.

The hydraulic motor 16 is provided with a motor cylinder 23 coaxially connected to the power collecting shaft 1, the motor cylinder 23 being in contact, in a rotatable and slidable manner, with an oil pressure distributing face 17b on the other face side of the control board 17; a plurality of motor plungers 25 fitted slidably in a like plurality of annularly arranged cylinder holes 24 so provided in the motor cylinder 23 as to surround the axis of the motor cylinder 23; and a motor swash plate 27 in a slidable contact with shoes 26 installed on the spherical tips of the motor plungers 25.

The control board 17 is fixed to a casing 28 which houses the hydraulic pump 15 and the hydraulic motor 16, and to this control board 17 is connected the second ring gear $12_1$ of the second planetary gear mechanism $6_1$.

In such a hydraulic continuously variable transmission apparatus 3, for every rotation of the pump cylinder 18, each of the pump plungers 20 makes one reciprocation in the cylinder hole 19 to accomplish discharge and suction operations with a stroke corresponding to the inclination angle of the pump swash plate 22, and the hydraulic pressure discharged from the cylinder hole 19 is transmitted via the high pressure side of a hydraulic circuit provided in the control board 17 and acts on the corresponding cylinder hole 24 of the motor cylinder 23 to expanded and drive the motor plunger 25. As the expanded motor plunger 25 presses the motor swash plate 27, the rotational direction component of its reaction force rotates the motor cylinder 23 via the motor plunger 25. Meanwhile, the motor plunger 25 that has completed its expansion operation is contracted by the motor swash plate 27, and the hydraulic pressure discharged from the cylinder hole 24 by the contraction operation is transmitted via the low pressure side of the hydraulic circuit in the control board 17 and is sucked into the cylinder hole 19 of the pump plunger 20 in sucking action. In this way, the motor cylinder 23 rotates at a torque corresponding to the inclination angle of the pump swash plate 22, and the rotational torque is transmitted to the power collecting shaft 1.

The rotation of the pump cylinder 18 in the hydraulic continuously variable transmission apparatus 3 can be stopped by a lock-up brake 30 provided as a stopping means between the first ring gear $8_1$ connected to the pump cylinder 18 and a fixed member 35, such as a transmission case. Also, between the transmission shaft 4 and the first sun gear $7_1$ functioning as an input member in the power transmission mechanism $2_1$, there is provided a lock-up clutch 31 as a directly connecting means capable of directly connecting the transmission shaft 4 to the first sun gear $7_1$ and flywheel F.

Figure 3:
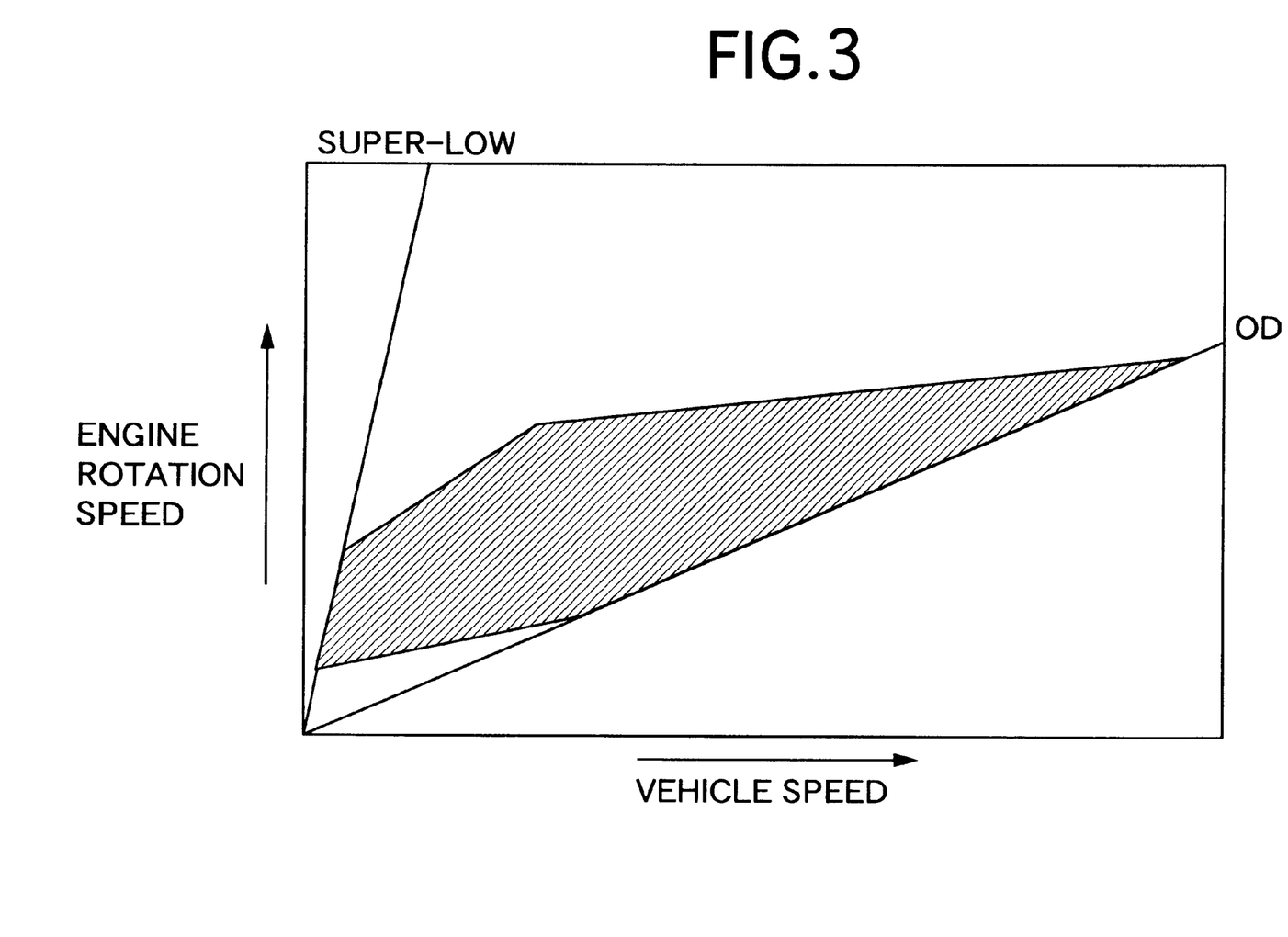
FIG. 3 is a diagram illustrating the region of speed change control when the throttle opening is at a low or medium degree for the apparatus of FIG. 1.
Figure 4:
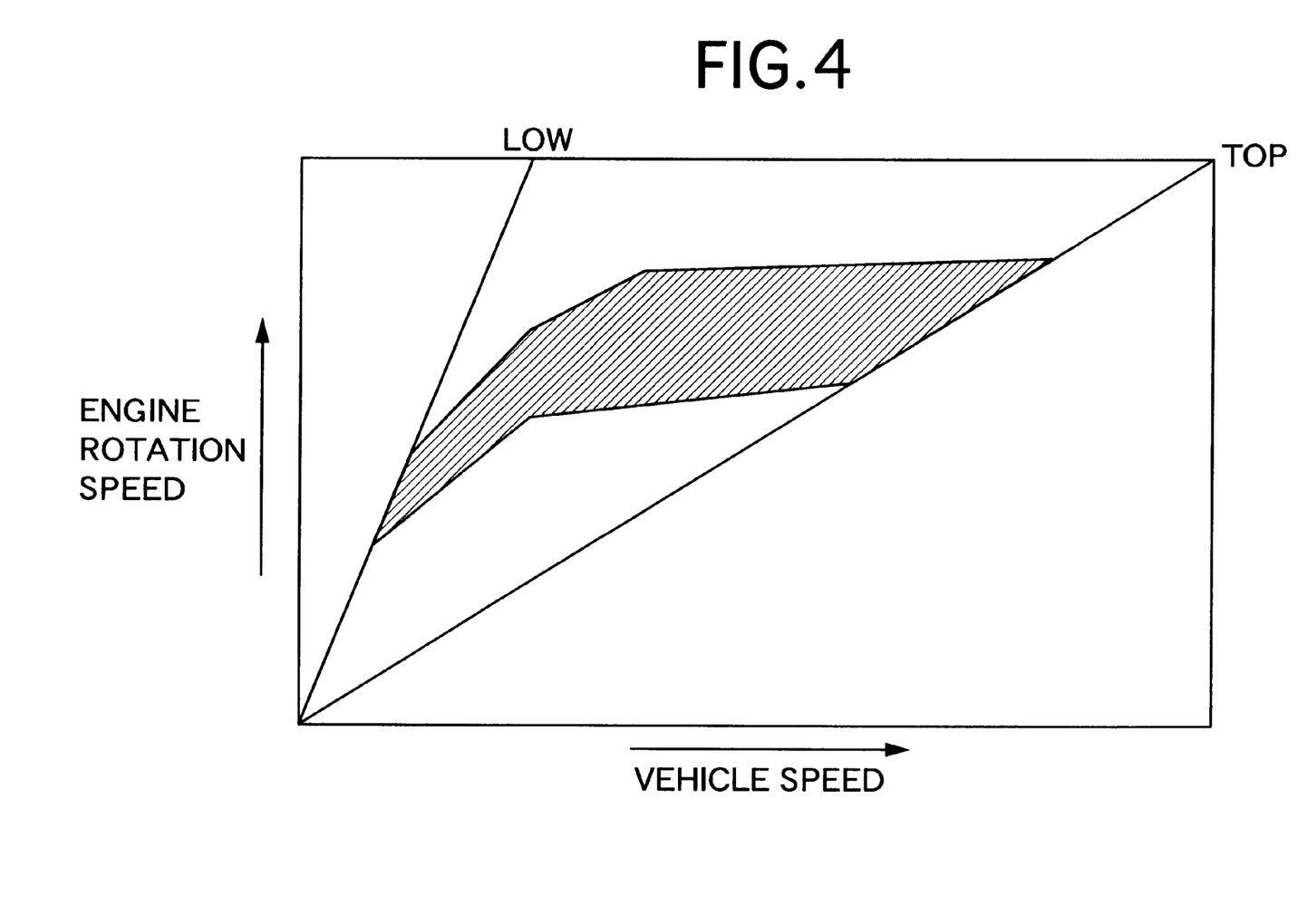
FIG. 4 is a diagram illustrating the region of speed change control when the throttle opening is at a high degree for the apparatus of FIG. 1.

In such a continuously variable transmission $T_1$, when the throttle opening of the engine E is at a low or medium degree, the region of speed change control is prescribed as represented by the hatched area in FIG. 3, and the gear ratio is determined over the whole range from the Super Low to the overdrive (OD) which is the minimum gear ratio. When the throttle opening of the engine E is at a high degree, the region of speed change control is prescribed as represented by the hatched area in FIG. 4, and the gear ratio is determined over a range from the Low to the Top which is a greater gear ratio than the minimum gear ratio.

Figure 5:
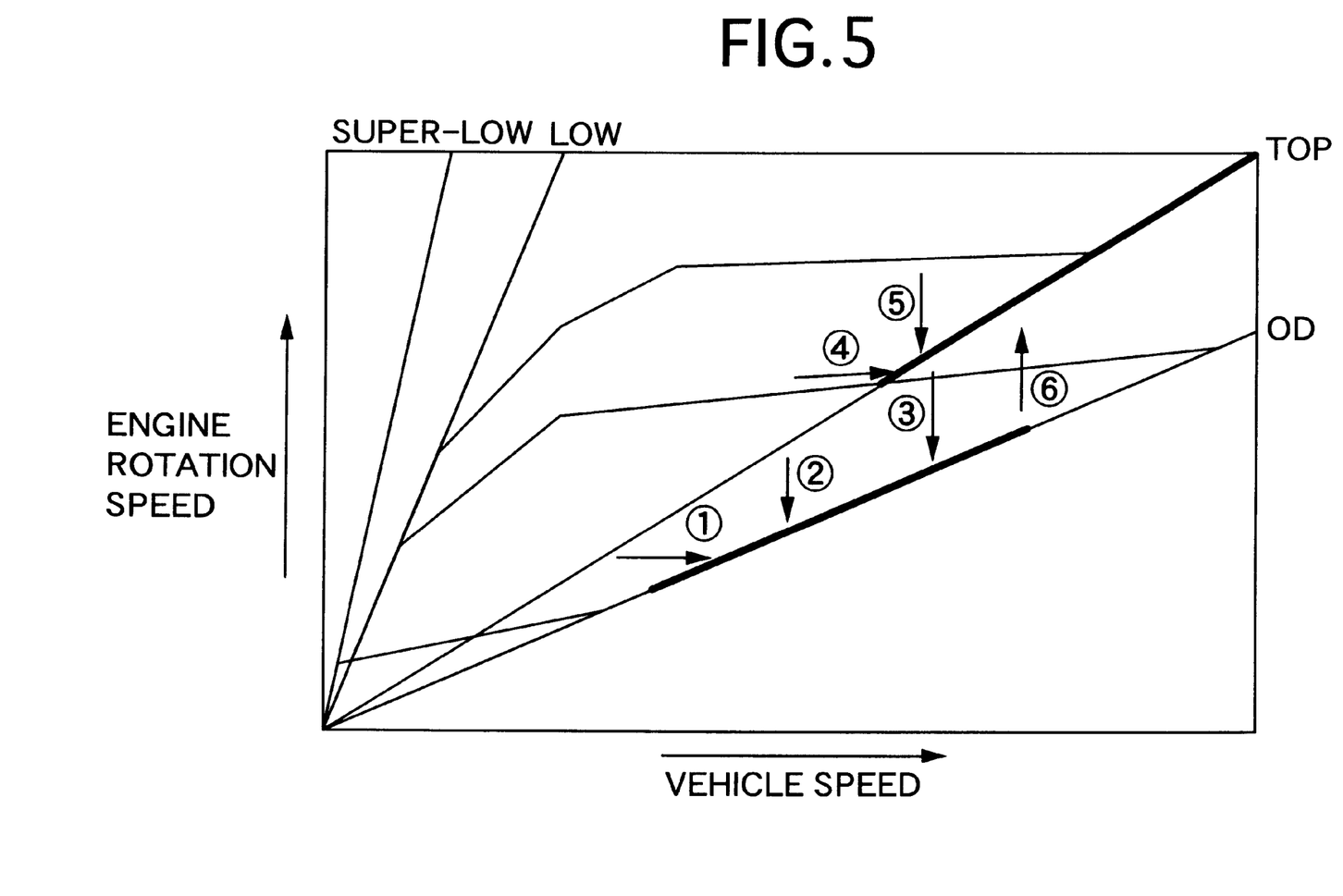
FIG. 5 is a diagram illustrating the operating ranges of a lock-up brake and a lock-up clutch for the apparatus of FIG. 1.

The rotation of the pump cylinder 18 in the hydraulic pump 15 is stopped by the lock-up break 30 in the region represented by a thick solid line along the line of the overdrive (OD) of FIG. 5. Also, direct connection of the transmission shaft 4 to the first sun gear $7_1$ by the lock-up clutch 31 is set in the region represented by a thick solid line along the line of the Top of FIG. 5.

Next the operation of this embodiment will be described. In a constant high speed vehicle operation during cruising or the like, the rotation of the hydraulic pump 15 is stopped by the lock-up brake 30. Thus, among the first sun gear $7_1$, the first ring gear $8_1$ and the first carrier $9_1$ constituting the first planetary gear mechanism $5_1$ in the power dividing mechanism $2_1$, the first ring gear $8_1$ connected to the hydraulic pump 15 and functioning as a first output member is also stopped, and the power from the engine E, in a state where the power transmission by the hydraulic continuously variable transmission apparatus 3 is rendered ineffective, is varied in speed by the first planetary gear mechanism $5_1$, whose first ring gear $8_1$ is blocked, and the second planetary gear mechanism $6_1$, and transmitted to the transmission shaft 4, making it possible to obtain an overdrive (OD) state which is the minimum gear ratio. Therefore, it is possible to obtain the minimum gear ratio with the engine E kept at slow rotation, making it possible to reduce the transmission sound by stopping the hydraulic continuously variable transmission apparatus 3 and also making it possible to enhance the transmission efficiency and improve the fuel consumption performance.

When sufficient driving force is required to accelerate the vehicle to overtake a vehicle traveling ahead on an expressway or to achieve the maximum speed, the first sun gear $7_1$ functioning as an input member in the power dividing mechanism $2_1$ and the transmission shaft 4 are directly connected by the lock-up clutch 31. Then, it is possible to obtain the Top state in which the gear ratio is greater than the minimum gear ratio, by directly transmitting the power mechanically from the flywheel F and first sun gear $7_1$ through the lock-up clutch 31 to the transmission shaft 4, not through the power dividing mechanism $2_1$ comprising the first and second planetary gear mechanisms $5_1$ and $6_1$ and not through the hydraulic continuously variable transmission apparatus 3, and obtain sufficient driving force in the region where such driving force is needed to satisfy the maximum speed performance, i.e., with a higher engine speed.

The stopping condition of the hydraulic pump 15 by the lock-up brake 30 is executed, when, for example, the throttle opening is at a low or medium degree, and the actual gear ratio has become an overdrive (OD) state as indicated by arrows ① and ② in FIG. 5, and when the actual gear ratio has become an overdrive (OD) state as a result of disconnection of the lock-up clutch 31 as indicated by arrow ③ in FIG. 5. Further, direct connection of the first sun gear $7_1$ and the transmission shaft 4 by the lock-up clutch 31 is executed when, for example, the throttle opening is at a high degree, and the actual gear ratio has become a Top state as indicated by arrows ④ and ⑤ in FIG. 5, and when the actual gear ratio has become a Top state as a consequence of kick-down to cancel the stop condition by the lock-up brake 30 as indicated by arrow ⑥ in FIG. 5.

Figure 6:
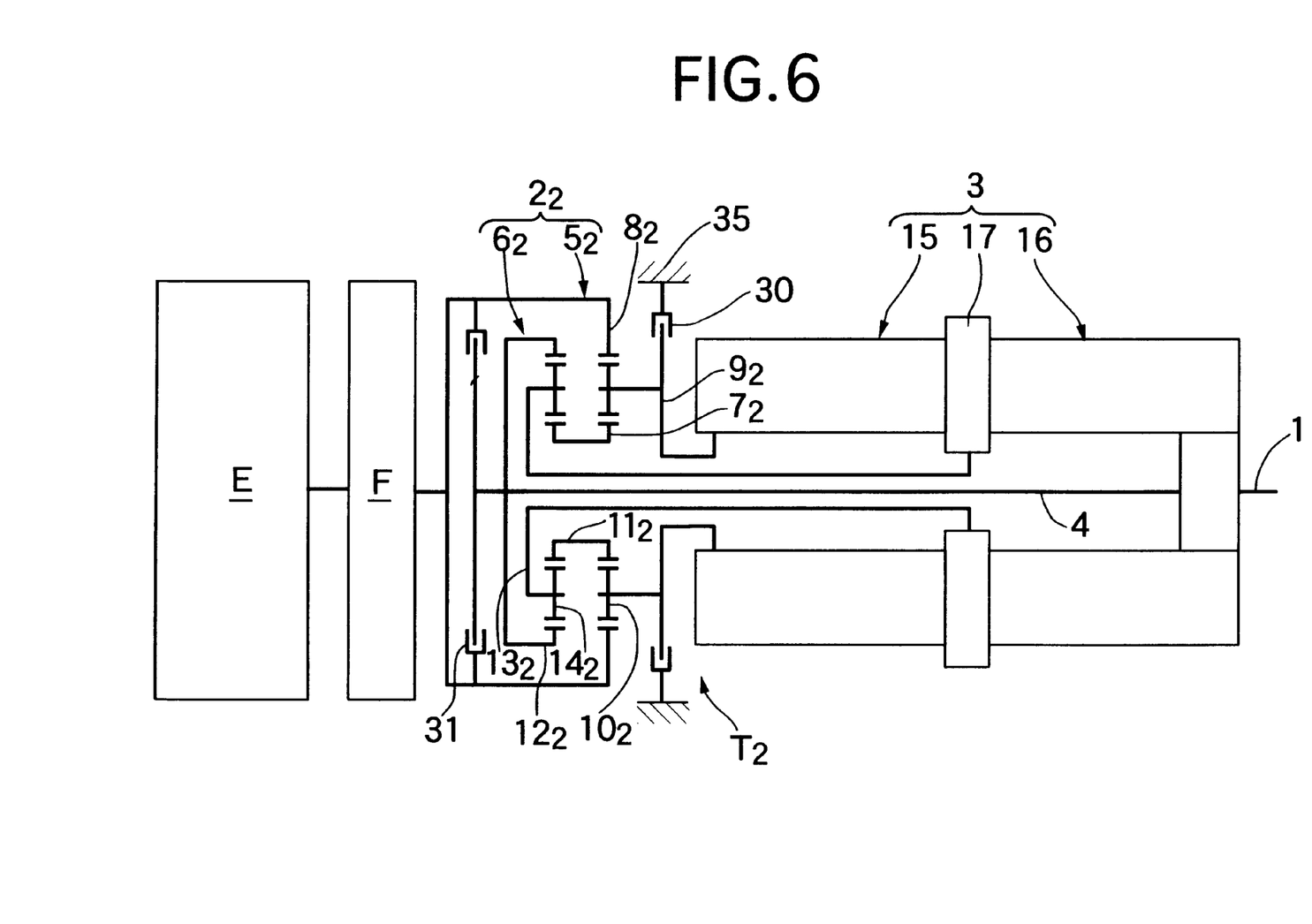
FIG. 6 is a diagram schematically illustrating a continuously variable transmission for vehicles, which is a second embodiment of the present invention.

FIG. 6 illustrates a second embodiment of the present invention, wherein parts corresponding to those of the above-described first embodiment are designated by the same reference symbols.

A continuously variable transmission $T_2$ is provided with a power dividing mechanism $2_2$, a hydraulic continuously variable transmission apparatus 3 and a transmission shaft 4, and the power dividing mechanism $2_2$ comprises a first planetary gear mechanism $5_2$ and a second planetary gear mechanism $6_2$.

The first planetary gear mechanism $5_2$ has as its constituent elements a first sun gear $7_2$ rotatable around the same axis as the transmission shaft 4, a first ring gear $8_2$ coaxially surrounding the first sun gear $7_2$, and a first carrier $9_2$ supporting, for free rotation, a plurality of first planetary gears $10_2$ engaging with the first sun gear $7_2$ and the first ring gear $8_2$. The first ring gear $8_2$ is connected to a flywheel F functioning as an input member, and the first carrier $9_2$ functions as a first output member for transmitting the power to the hydraulic pump 15 of the hydraulic continuously variable transmission apparatus 3.

The second planetary gear mechanism $6_2$ has as its constituent elements a second sun gear $11_2$ rotatable around the same axis as the transmission shaft 4, a second ring gear $12_2$ coaxially surrounding the second sun gear $11_2$, and a second carrier $13_2$ supporting, for free rotation, a plurality of second planetary gears $14_2$ engaging with the second sun gear $11_2$ and the second ring gear $12_2$. The second sun gear $11_2$ is integrally connected to the first sun gear $7_2$ of the first planetary gear mechanism $5_2$, the second ring gear $12_2$ is integrally connected to the transmission shaft 4 to function as a second output member, and the second carrier $13_2$ is connected to a control board 17 of the hydraulic continuously variable transmission apparatus 3 functioning as a stationary member.

A lock-up brake 30 for stopping the hydraulic pump 15 of the hydraulic continuously variable transmission apparatus 3 is provided between the first carrier $9_2$ connected to the hydraulic pump 15 and a fixed member 35, and a lock-up clutch 31 is provided between the transmission shaft 4 and the first ring gear $8_2$ functioning as an input member in the power transmission mechanism $2_2$.

This second embodiment can achieve the same effects as the above-described first embodiment.

Figure 7:
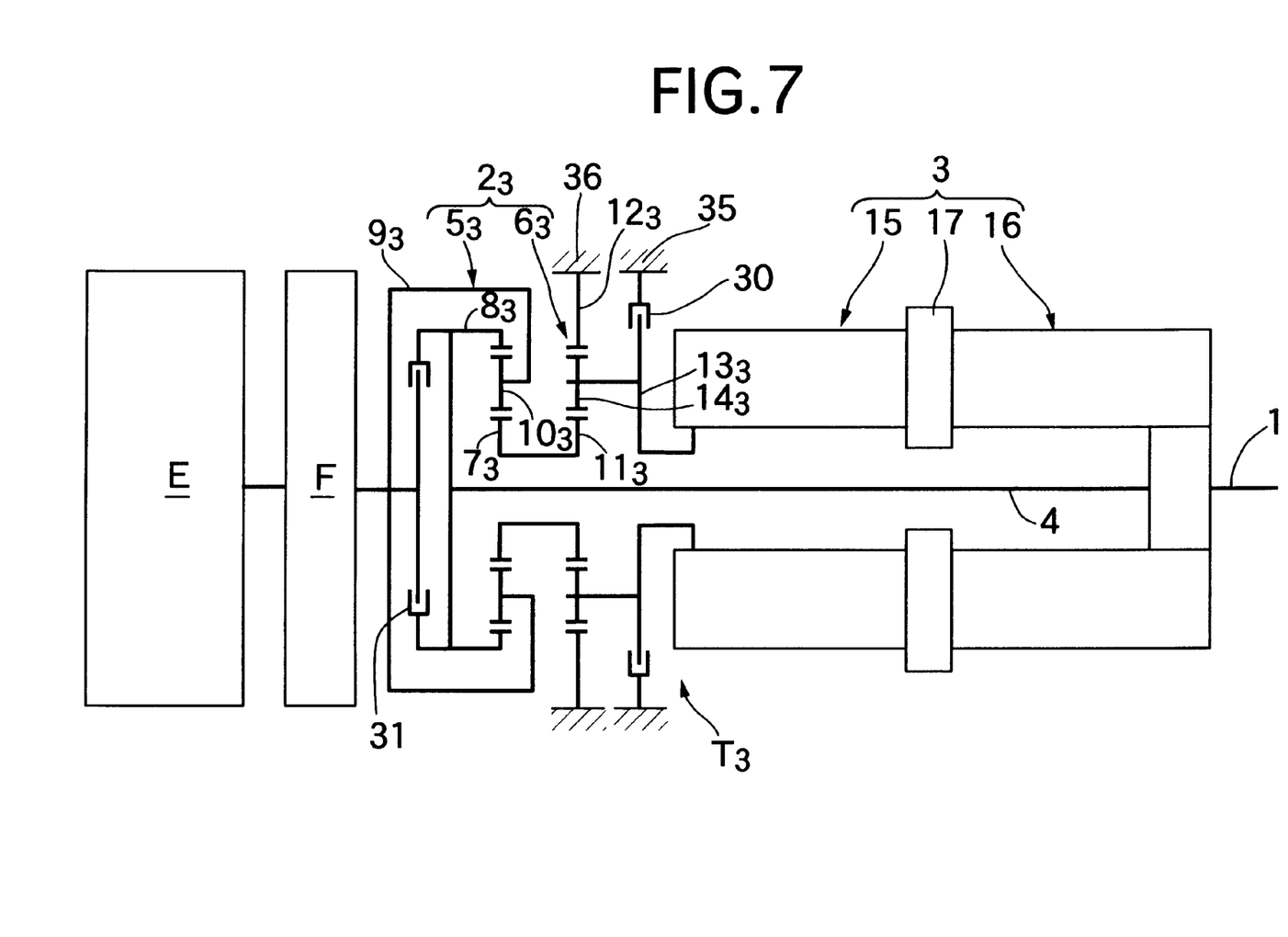
FIG. 7 is a diagram schematically illustrating a continuously variable transmission for vehicles, which is a third embodiment of the present invention.

FIG. 7 illustrates a third embodiment of the present invention, wherein parts corresponding to those of the above-described embodiments are designated by the same reference symbols.

A continuously variable transmission $T_3$ is provided with a power dividing mechanism $2_3$, a hydraulic continuously variable transmission apparatus 3, and a transmission shaft 4, and the power dividing mechanism $2_3$ comprises a first planetary gear mechanism $5_3$ and a second planetary gear mechanism $6_3$.

The first planetary gear mechanism $5_3$ has as its constituent elements a first sun gear $7_3$ rotatable around the same axis as the transmission shaft 4, a first ring gear $8_3$ coaxially surrounding the first sun gear $7_3$, and a first carrier $9_3$ supporting, for free rotation, a plurality of first planetary gears $10_3$ engaging with the first sun gear $7_3$ and the first ring gear $8_3$, in which the first carrier $9_3$ is connected to a flywheel F so as to function as an input member and the first ring gear $8_3$ is connected to the transmission shaft 4 as a second output member.

The second planetary gear mechanism $6_3$ has as its constituent elements a second sun gear $11_3$ rotatable around the same axis as the transmission shaft 4, a second ring gear $12_3$ coaxially surrounding the second sun gear $11_3$, and a second carrier $13_3$ supporting, for free rotation, a plurality of second planetary gears $14_3$ engaging with the second sun gear $11_3$ and the second ring gear $12_3$. The second sun gear $11_3$ is integrally connected to the first sun gear $7_3$ of the first planetary gear mechanism $5_3$, the second carrier $13_3$ is connected to a hydraulic pump 15 of the hydraulic continuously variable transmission apparatus 3 into one unit as a first output member, and the second ring gear $12_3$ is connected to a stationary member 36.

A lock-up brake 30 for stopping the hydraulic pump 15 of the hydraulic continuously variable transmission apparatus 3 is provided between the second carrier $13_3$ connected to the hydraulic pump 15 and a fixed member 35, and a lock-up clutch 31 is provided between the transmission shaft 4 and the first carrier $9_3$ functioning as an input member in the power transmission mechanism $2_3$.

This third embodiment can achieve the same effects as the above-described first and second embodiments.

Whereas the embodiments of the present invention have been described above in detail, the invention is not limited to the above-described embodiments, but various design modifications can be made without deviating from the invention stated in the Claims.

For instance, the invention can be applied to the case where an electric motor is used as the prime mover in place of the engine. Although the hydraulic pump 15 is configured in a variable displacement type in the hydraulic continuously variable transmission apparatus 3, only either of the hydraulic pump 15 and the hydraulic motor 16 needs to be configured in a variable displacement type. Further, though the hydraulic pump 15 and the hydraulic motor 16 are arranged on the same axis in the hydraulic continuously variable transmission apparatus 3 in the above-described embodiments, it is also possible to use a hydraulic continuously variable transmission apparatus in which a hydraulic pump 15 and a hydraulic motor 16 are arranged on two axes parallel to each other. Furthermore, while planetary gears engaging with the outer circumference of the sun gear and with the inner circumference of the ring gear are held for rotation by a carrier in the first and second planetary gear mechanisms, the planetary gears may comprise first planetary gears engaging with the outer circumference of the sun gear and second planetary gears engaging with the first planetary gears and inner circumference of the ring gear that are rotatably supported by the carrier, and then the freedom of setting gear ratio increases.

As previously described, according to the present invention, it is made possible to reduce the sound of the transmission, enhance the transmission efficiency and improve the fuel consumption performance by stopping the hydraulic continuously variable transmission apparatus by mechanically transmitting the power directly from the power dividing mechanism to the transmission shaft upon the stopping of the hydraulic pump to achieve the minimum gear ratio, and to obtain sufficient driving force in the region where such driving force is needed to satisfy the maximum speed performance by achieving a greater gear ratio than the minimum gear ratio by mechanical power transmission through direct connection of the input member and the transmission shaft.

We claim:

1. A continuously variable transmission for vehicles, including a power dividing mechanism provided with an input member to which the power from a prime mover is inputted and first and second output members, said power dividing mechanism having means for dividing the power inputted to said input member and outputting it from the first and second output members; a hydraulic continuously variable transmission apparatus provided with a hydraulic pump connected to the first output member and a hydraulic motor constituting a closed hydraulic circuit together with the hydraulic pump, at least one of either the hydraulic pump and the hydraulic motor being configured in a variable displacement type; transmitting means for mechanically transmitting power and connected to the second output member; and means for collecting the power from said hydraulic motor and transmitting means and outputting it; wherein said power dividing mechanism includes, means for varying the speed of power inputted to said input member and dividing it between the first and second output members, stopping means for stopping the rotation of said hydraulic pump being provided between said hydraulic pump and a fixed member so that the power from the input member may be mechanically transmitted to the transmitting means only via the power dividing mechanism to achieve a minimum gear ratio, and directly connecting means for directly connecting said input member to said transmitting means being provided between said input member and transmitting means so that the power from said input member is directly and mechanically transmitted to said transmitting means to achieve a greater gear ratio than said minimum gear ratio.

2. A continuously variable transmission, according to claim 1, wherein said power dividing mechanism is provided with first and second planetary gear mechanisms; said first planetary gear mechanism having as its constituent elements a first sun gear, a first ring gear and a first carrier, with a first constituent element connected to the prime mover as said input member; said second planetary gear mechanism having as its constituent elements a second sun gear, a second ring gear and a second carrier, with a first constituent element connected to a stationary member; a second constituent element of the first planetary gear mechanism and a second constituent element of the second planetary gear mechanism connected to each other; and one of a third constituent element in the first planetary gear mechanism and a third constituent element in the second planetary gear mechanism connected to the hydraulic pump as the first output member; and the other of the third constituent element in the first planetary gear mechanism and the third constituent element in the second planetary gear mechanism is connected to the transmitting means as the second output member.

3. A continuously variable transmission for a vehicle, including a power dividing mechanism having a power input member and first and second power output members, a hydraulic continuously variable transmission apparatus with a hydraulic pump and a hydraulic motor, the hydraulic pump connected to the first output member, and mechanical power transmitting means connected to the second output member; said power dividing mechanism having means for selectively producing first and second gear ratios between the input member and the first and second output members, respectively, including a brake device for stopping the rotation of said hydraulic pump for transmitting the power from the input member mechanically through the power dividing mechanism to the second output and then to the transmitting means to produce said first gear ratio comprising a minimum gear ratio and a lock-up clutch device for directly connecting the input member to the transmitting means for directly and mechanically transmitting power from the input member through the second output member to the transmitting means to produce said second gear ratio comprising a greater gear ratio than said minimum gear ratio.

4. A continuously variable transmission, as stated in claim 3, wherein said power dividing mechanism is provided with first and second planetary gear mechanisms; said first planetary gear mechanism having as its constituent elements a first sun gear, a first ring gear and a first carrier, with a first constituent element comprising the input member; said second planetary gear mechanism having as its constituent elements a second sun gear, a second ring gear and a second carrier, with a first constituent element connected to a stationary member; a second constituent element in the first planetary gear mechanism and a second constituent element in the second planetary gear mechanism connected to each other; and one of a third constituent element in the first planetary gear mechanism and a third constituent element in the second planetary gear mechanism connected to the hydraulic pump as the first output member; and the other of the third constituent element in the first planetary gear mechanism and the third constituent element in the second planetary gear mechanism connected to the transmitting means as the second output member.

5. A continuously variable transmission, as stated in claim 3, wherein said power dividing mechanism is provided with two planetary gear mechanisms with the first output member comprising a constituent element of one planetary gear mechanism and the second output member comprising a constituent element of the other planetary gear mechanism.

* * * * *